United States Patent [19]
Ishizuka et al.

[11] Patent Number: 5,557,396
[45] Date of Patent: Sep. 17, 1996

[54] VELOCITY INFORMATION DETECTING APPARATUS

[75] Inventors: Koh Ishizuka, Ohmiya; Satoshi Ishii; Yasushi Kaneda, both of Tokyo, Japan

[73] Assignee: Canon Kabushiki Kaisha, Tokyo, Japan

[21] Appl. No.: 203,409

[22] Filed: Mar. 1, 1994

[30] Foreign Application Priority Data

Mar. 5, 1993 [JP] Japan ................... 5-045254

[51] Int. Cl.$^6$ .................. G01P 3/36; G01B 11/02
[52] U.S. Cl. ........................... 356/28.5; 356/358
[58] Field of Search .................. 356/28, 28.5, 373, 356/374, 375, 358

[56] References Cited

U.S. PATENT DOCUMENTS 3,820,863  6/1974  Stavis ..................... 356/28
3,825,341  7/1974  Goto ...................... 356/28

FOREIGN PATENT DOCUMENTS 0548848  6/1993  European Pat. Off. .
2394092  1/1979  France .
9106409  1/1992  Germany .

OTHER PUBLICATIONS

Manning, R., "Optical Design for a Laser Flow Meter," *Optics and Laser Technology*, Jun. 1973, pp. 114–118.

*Primary Examiner*—Stephen C. Buczinski
*Attorney, Agent, or Firm*—Fitzpatrick, Cella, Harper & Scinto

[57] ABSTRACT

A velocity information detecting apparatus detects velocity information of a moving object. The apparatus is provided with a light source for emitting a coherent beam, a beam splitting member for splitting the beam from the light source into a plurality of beams to irradiate the object thereby, and a photodetector for receiving scattered light from the object. The velocity information of the object is detected, based on a Doppler shift of the scattered light detected by the photodetector. The plurality of beams irradiate the object disposed in a region before the plurality of beams are spatially separated from each other. The beam splitting member may be either a diffraction grating or a prism member. The diffraction grating may be a lamellar phase grating or a blazed diffraction grating. The prism member may be a roof prism.

19 Claims, 10 Drawing Sheets

VELOCITY INFORMATION DETECTING APPARATUS

BACKGROUND OF THE INVENTION

1. Field of the Invention

The present invention relates to a velocity information detecting apparatus for optically detecting information about velocity of relative motion of an object.

2. Related Background Art

An optical Doppler velocity measuring apparatus has been used heretofore for precisely measuring a velocity for example of a rotary drum in a video recorder. Various optical heads of inch size have been developed according to a recent demand of miniaturization.

Figure 1:
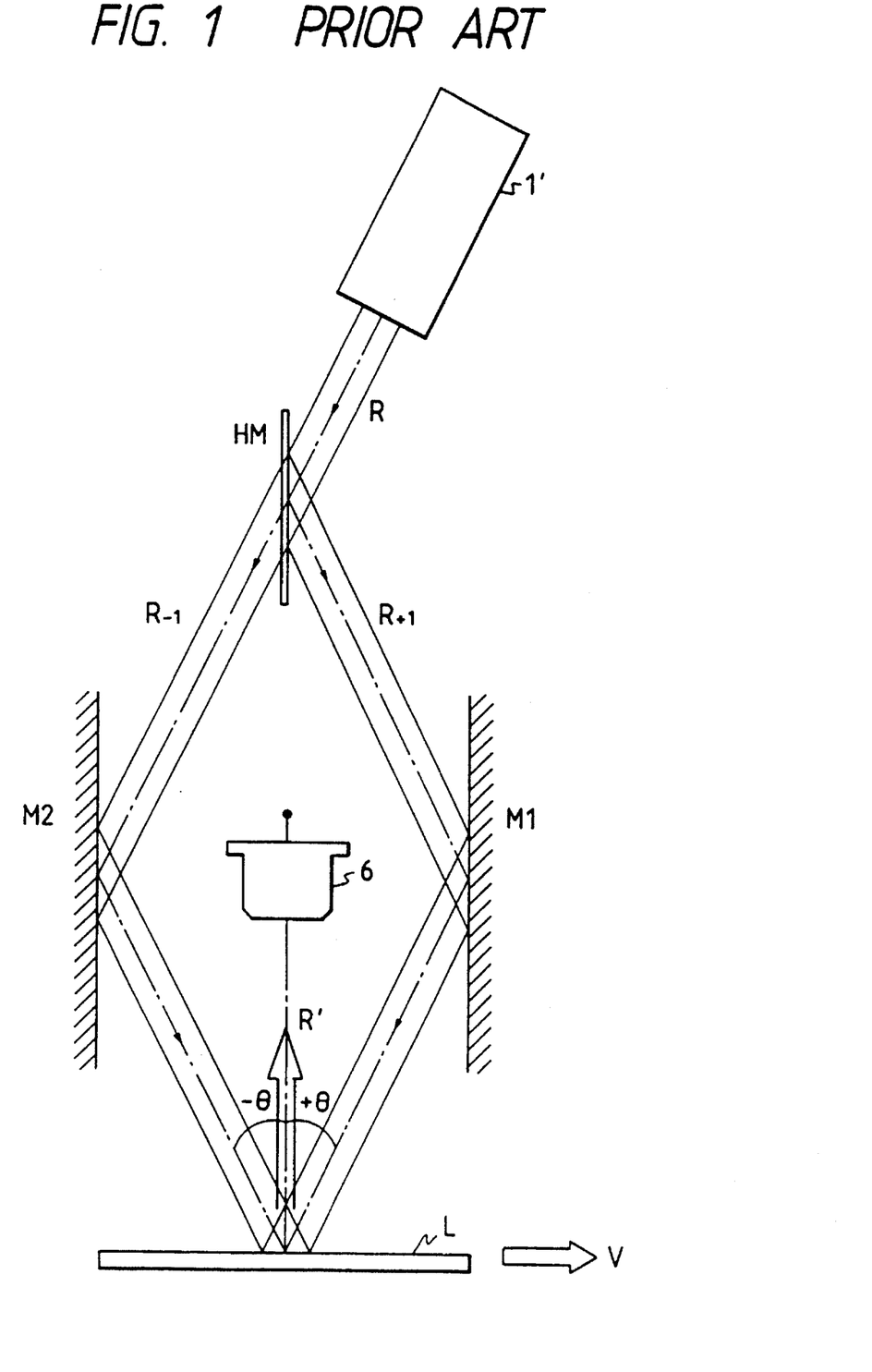
FIG. 1 is an explanatory drawing to show a conventional example.

FIG. 1 is a drawing of optical arrangement to show a conventional laser Doppler velocity sensor.

A collimated beam R emitted from a wavelength stabilized gas laser 1' (wavelength $\lambda$) is split by a half mirror HM into two beams R+1 and R−1. The optical axes of principal rays of the beams are bent by respective mirrors M1, M2, and the beams impinge at incident angles +θ and −θ at a same point on an object L relatively moving at velocity v.

A beam R' scattered from the object and including Doppler signal light is guided toward a light receiving element 6. The light receiving element 6 outputs a signal containing a component with a frequency being a Doppler frequency f as defined by the following formula, which is included in the scattered light.

$$f = (2 \cdot v \cdot \sin\theta)/\lambda$$

A moving velocity of the object can be known by extracting a necessary frequency signal band by a suitable frequency discriminator and counting the frequency of the periodic signal.

The recent demand becomes stronger to obtain a further miniaturized velocity meter. In order to further miniaturize the optical heads down to the millimeter size, new ideas must be introduced for the optical paths or optical systems.

SUMMARY OF THE INVENTION

It is a primary object of the present invention to provide a velocity information detecting apparatus which can be composed of a less number of optical components in a simplified arrangement, enabling further miniaturization.

Other objects of the present invention will be apparent in the following description of embodiments.

DESCRIPTION OF THE PREFERRED EMBODIMENTS

Figure 2A:
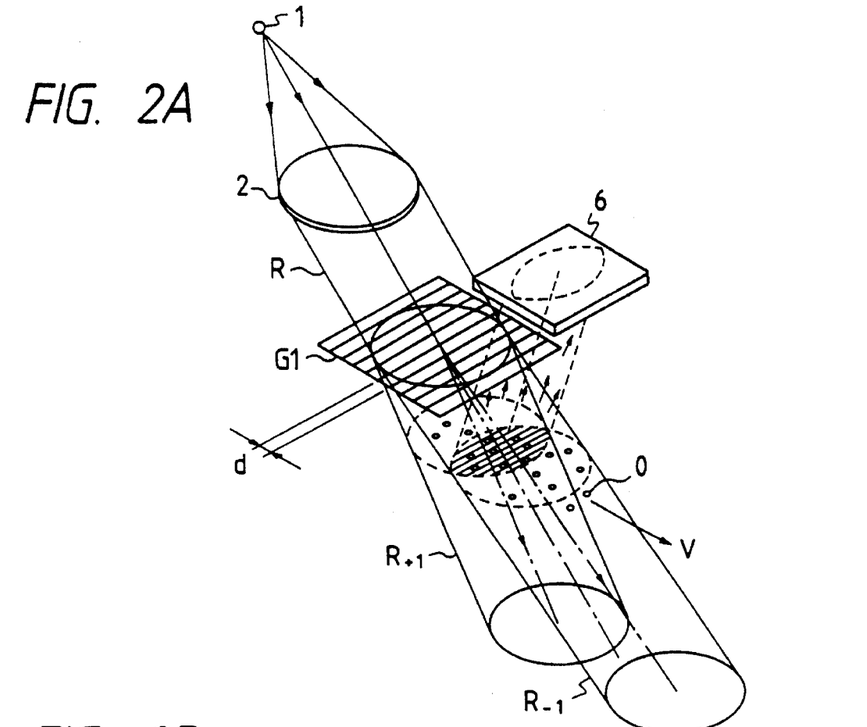
FIG. 2A is an explanatory drawing to illustrate the principle of a laser Doppler velocity meter in a first embodiment of the present invention.
Figure 2B:
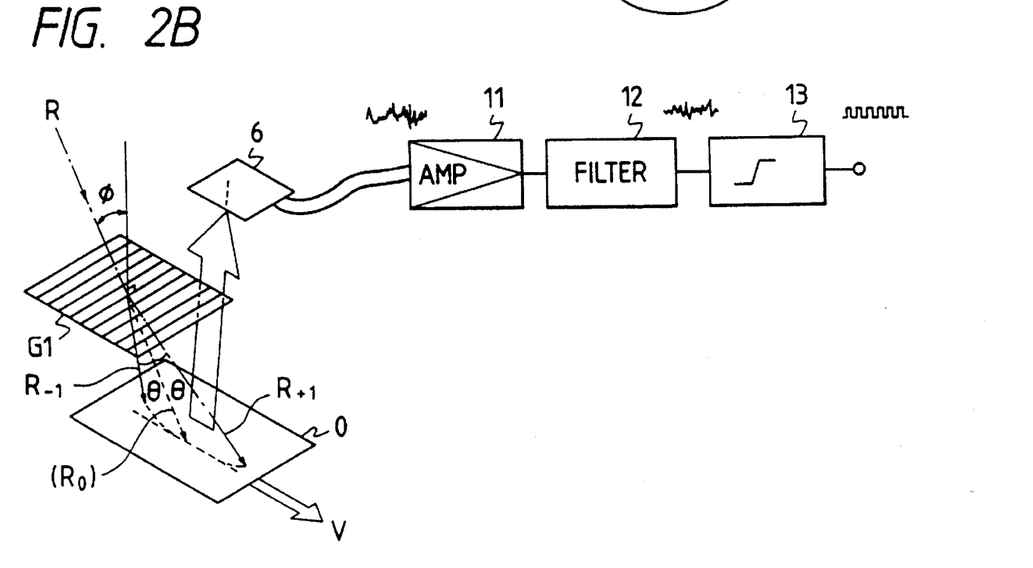
FIG. 2B is a schematic diagram to show a signal processing system part in the embodiment.
Figure 3:
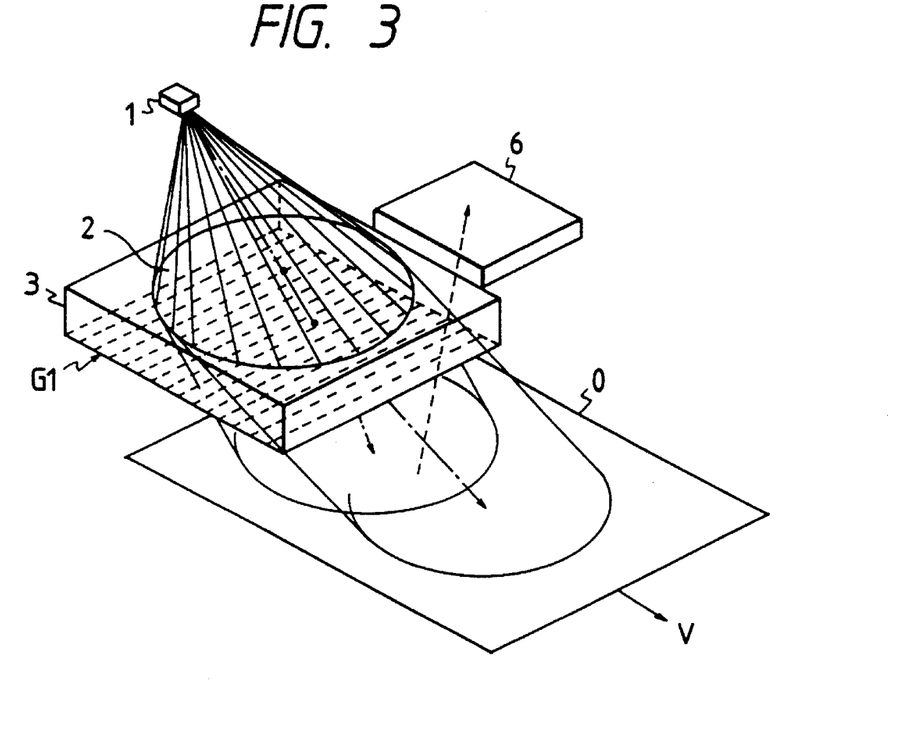
FIG. 3 is a schematic diagram to show an optical system part in the embodiment.
Figure 4:
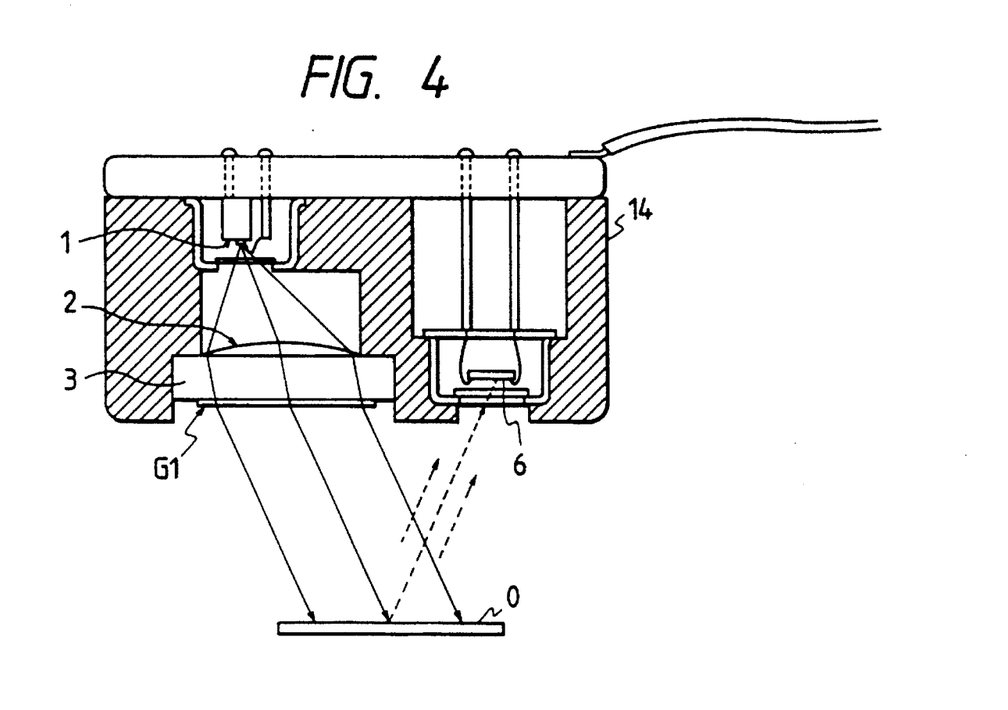
FIG. 4 is a cross sectional view to show an optical apparatus part in the embodiment.

FIG. 2A is an explanatory drawing to show the principle of a laser Doppler velocity meter in the first embodiment of the present invention; FIG. 2B a schematic diagram to show a signal processing system part in the first embodiment; FIG. 3 a schematic diagram to show an optical system part in the first embodiment; and FIG. 4 a cross sectional view of an optical apparatus part in the first embodiment. In the drawings, reference numeral 1 designates a light emitting element (for example, laser diode), 2 a collimator lens, 3 a glass plate, R a beam, G1 a diffraction grating, 6 a light receiving element, 11 an amplifier for amplifying a signal, 12 a frequency filter, 13 a binarizing circuit, and 14 a receptacle for containing the members. As shown in FIGS. 3 and 4, the collimator lens 2 and the diffraction grating G1 are set on the front face and on the back face of the glass plate 3, respectively.

The principle of measurement will be described mainly referring to FIG. 2A. Divergent light emitted from the light emitting element 1 (wavelength $\lambda$) is collimated by the collimator lens 2 into a collimated beam R. The collimated beam R is incident obliquely at angle $\phi$ into the diffraction grating G1 (grating pitch d) and is split into +1st order diffracted light beam R+1 and −1st order diffracted light beam R−1. The two beams R+1 and R−1 are outgoing at respective diffraction angles +θ and −θ as shown in FIG. 2B. An object O relatively moving at velocity v is located in a region in which the two beams outgoing from diffraction grating G1 and having a expanse in the direction perpendicular to the optical axis are not yet spatially completely separated from each other. The beams are scattered on the scattering surface of the object O, so that strong scattered light including the Doppler frequency component f emerges in the direction as indicated by the arrow.

The scattered light is incident at high efficiency into the light receiving element 6 set immediately next to the diffraction grating G1.

The light receiving element 6 outputs a signal containing a frequency component (Doppler shift) of the following Doppler frequency f as defined by the following formula, included in the scattered light.

$$f=(2\cdot v\cdot \sin\theta)/\lambda$$

Then, as shown in FIG. 2B, only a necessary frequency signal band is extracted by a suitable frequency discriminating circuit (frequency filter 12) from the signal amplified by the amplifier 11, the extracted signal is then binarized by the binarizing circuit 13, a frequency of the periodic signal is obtained by counting signals per unit time by an unrepresented counter, and the velocity is calculated according to the above formula by an unrepresented computing unit, whereby the moving velocity of the object can be known.

Since the optical system is so arranged as to satisfy the relation of d·sinθ=λ, the pitch of interference fringes formed in the space by the diffracted beams R+1, R−1 emergent from the diffraction grating G1 is independent of the wavelength λ of the light source and maintains a half of the pitch d of the diffraction grating G1, keeping the Doppler frequency f unchanged. Namely, putting d·sinθ=λ into the above formula for the frequency f, the following formula without wavelength λ is derived.

$$f=2\cdot v/d$$

Accordingly, the laser diode which could have wavelength variations can be used without any modification, which can obviate a temperature stabilizing mechanism, realizing a compact Doppler velocity sensor easy to handle.

The present embodiment includes no optical system for bending the optical paths of two beams in the optical system, which is very simple in structure and suitable for miniaturization. Also, the scattered light can be taken at high efficiency into the light receiving element, which permits signals with good S/N ratio to be obtained. Especially, since the present embodiment is so arranged that the diffraction grating G1 and the lens 2 are formed on the both faces of glass plate 3 as incorporated therewith, the apparatus can be constructed in a simple arrangement of only three components, i.e., the light emitting element, the light receiving element and the glass plate composite optical component, which is suitable for reduction in thickness.

Figures 5, 6:
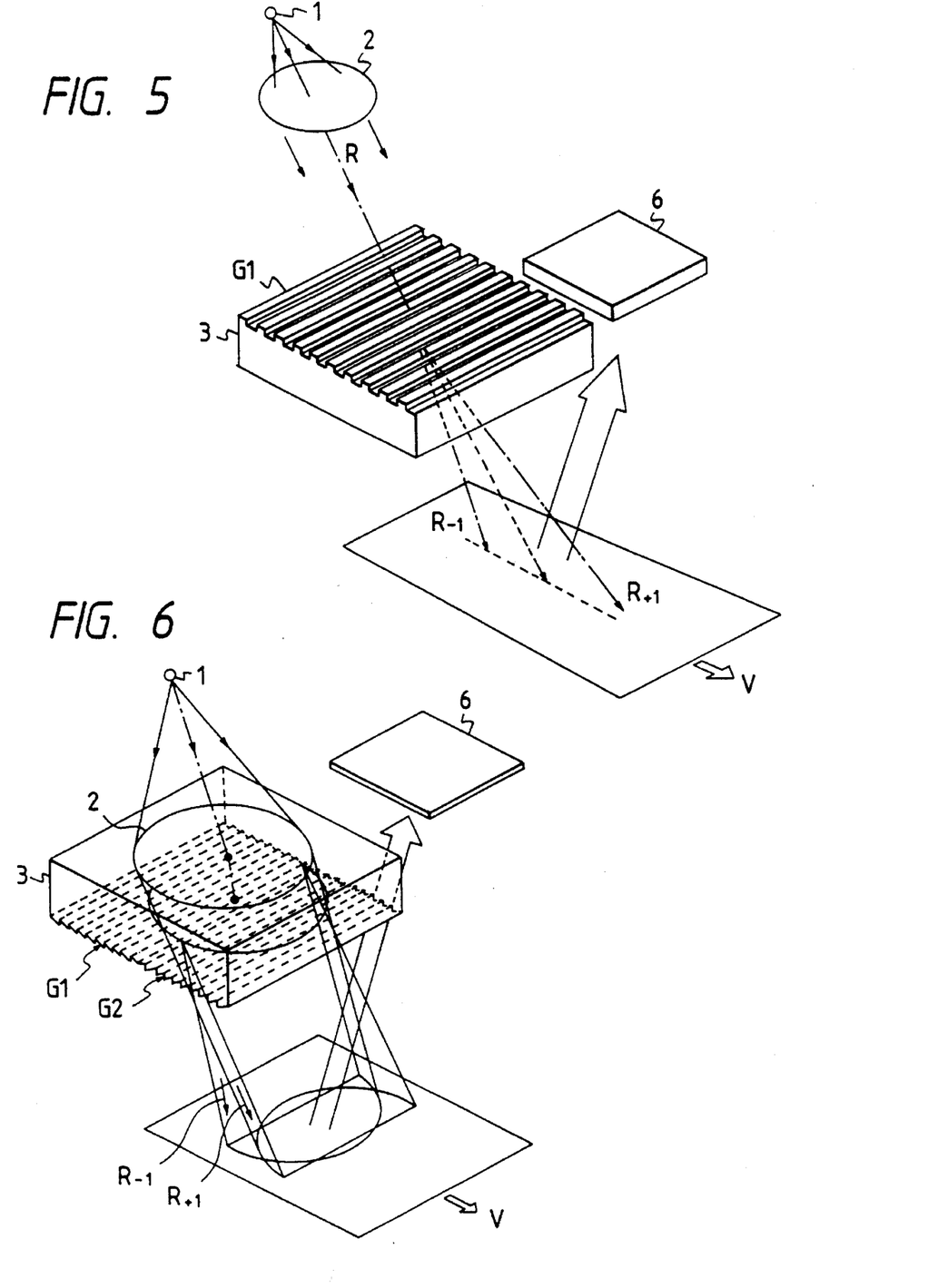
FIG. 5 is an explanatory drawing to show a second embodiment of the present invention.
FIG. 6 is an explanatory drawing to show a third embodiment of the present invention.

FIG. 5 is an explanatory drawing to show the second embodiment of the present invention. The same elements as those in the first embodiment are denoted by the same reference numerals. In the present embodiment, the diffraction grating G1 is a lamellar phase grating. The diffraction grating G1 is set on the upper surface of glass plate 3, but the collimator lens 2 is arranged separate from the glass plate 3.

Divergent light emitted from the light emitting element 1 (wavelength λ) is collimated by the collimator lens 2 into a collimated beam R, the thus collimated beam R is incident obliquely at angle φ into the lamellar phase grating G1, and the beam is split into two diffracted beams R+1 and R−1, and the diffracted beams R+1 and R−1 are outgoing at respective angles +θ and −θ. An object relatively moving at velocity v is located in a region in which the two beams outgoing from the lamellar phase grating G1 are not yet spatially completely separated from each other. The beams are scattered on the scattering surface L of the object, so that strong scattered light including the Doppler frequency component f is emergent in the direction shown by the arrow. The scattered light is incident at high efficiency into the light receiving element 6 set immediately next to the diffraction grating G1. The signal processing is the same as in the first embodiment as described above.

In the present embodiment, the lamellar phase grating G1 is given steps as arranged such that the diffracted beams emergent therefrom are substantially only ±1st order light beams R+1, R−1 (especially with no zeroth order beam), whereby the interference fringes projected into the space become clearer and signals with higher S/N ratio can be obtained. In other words, since the energy concentration of specific order (±1st order beams) by the lamellar phase grating G1 is utilized, no unnecessary diffracted light appears, which enhances the utilization factor of light quantity so as to permit signals with higher S/N to be obtained.

FIG. 6 is an explanatory drawing to show the third embodiment of the present invention. The same elements as those in the first embodiment are denoted by the same reference numerals. In the present embodiment, the diffraction grating is opposite blazed gratings G1, G2.

Divergent light emitted from the light emitting element 1 (wavelength λ) is collimated by the collimator lens 2 into a collimated beam R, the collimated beam R is incident obliquely at angle φ into the blazed gratings R1, R2, and a beam R+1 is emergent from the diffraction grating G1 and a beam R−1 from the diffraction grating G2, which are outgoing at respective angles +θ and −θ. An object relatively moving at velocity v is located in a region in which the two beams outgoing from the diffraction grating G2 are not yet spatially completely separated from each other. The two beams are scattered on the scattering surface L of the object, so that strong scattered light including the Doppler frequency component f emerges in the direction as shown by the arrow. The scattered light is incident at high efficiency into the light receiving element 6 set immediately next to the diffraction gratings G1, G2.

In the present embodiment, particularly, the diffraction gratings are given such respective blaze angles that the diffracted beams produced by the blazed diffraction gratings G1, G2 arranged in the opposite directions to each other are substantially only ±1st order beams R+1, R−1, whereby the interference fringes projected into the space become stronger and clearer, obtaining signals with higher S/N. Namely, since the present embodiment utilizes the energy concentration of specific order (±1st order beams) by the blazed diffraction gratings G1, G2, no unnecessary diffracted light appears and therefore the utilization factor of light quantity is high, which permits signals with higher S/N to be obtained.

Figure 7:
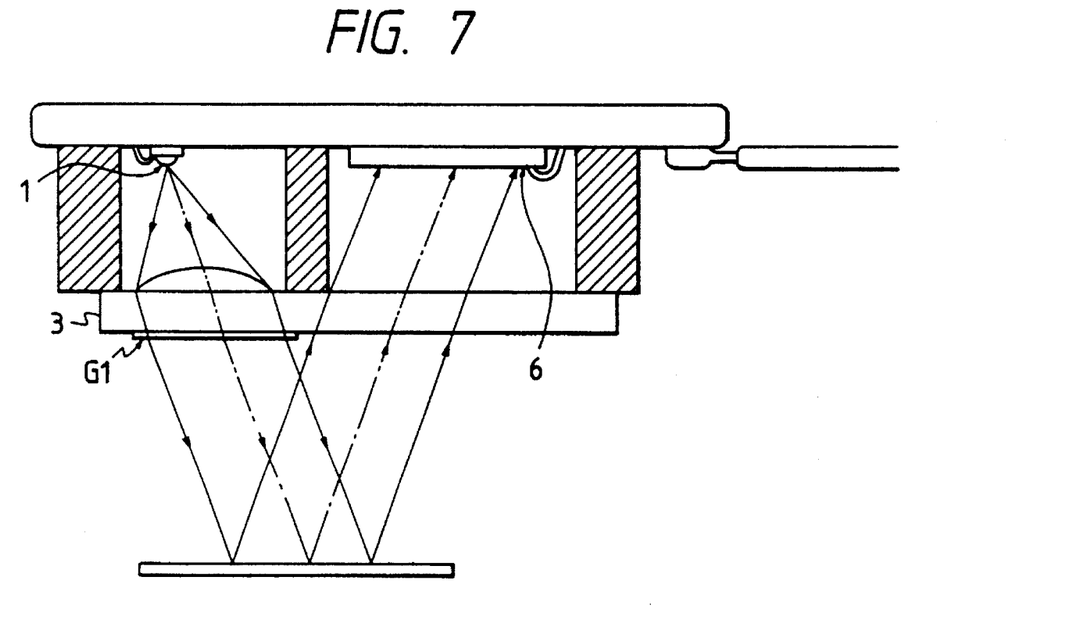
FIG. 7 is a modification of the arrangement shown in FIG. 4.

A possible modification of FIG. 4 is arranged, as shown in FIG. 7, such that the glass plate 3 covers the light receiving element as well, and thus the scattered light passes through the glass plate 3 then to enter the light receiving element 6.

Figure 8:
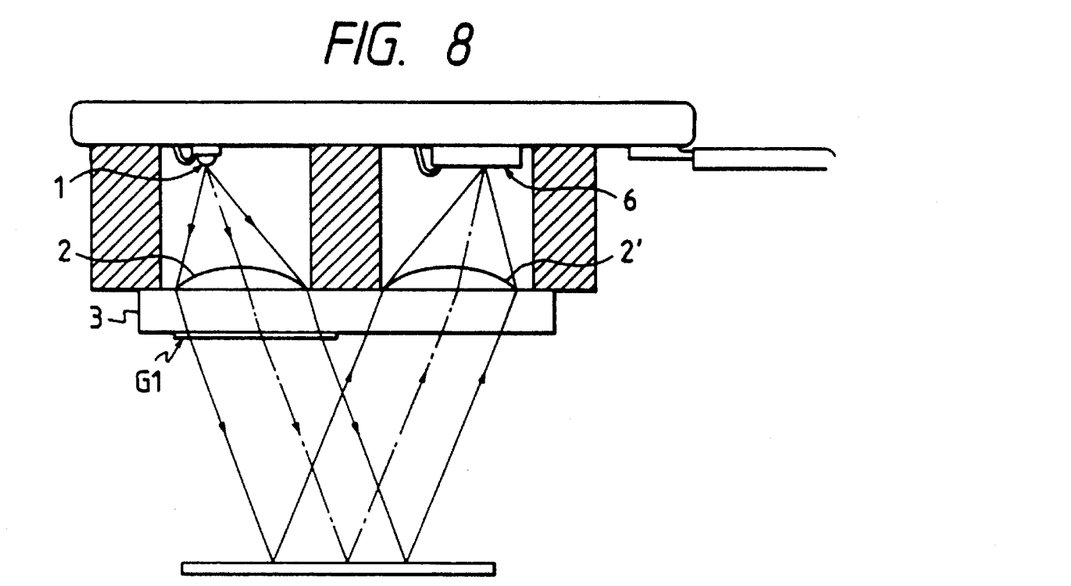
FIG. 8 is another modification of the arrangement shown in FIG. 4.

Another modification is arranged, as shown in FIG. 8, such that in addition to the arrangement of the above modification, a lens 2' is further provided on the glass plate 3 to condense the scattered light and the thus condensed light is made incident into the light receiving element 6.

Figure 9:
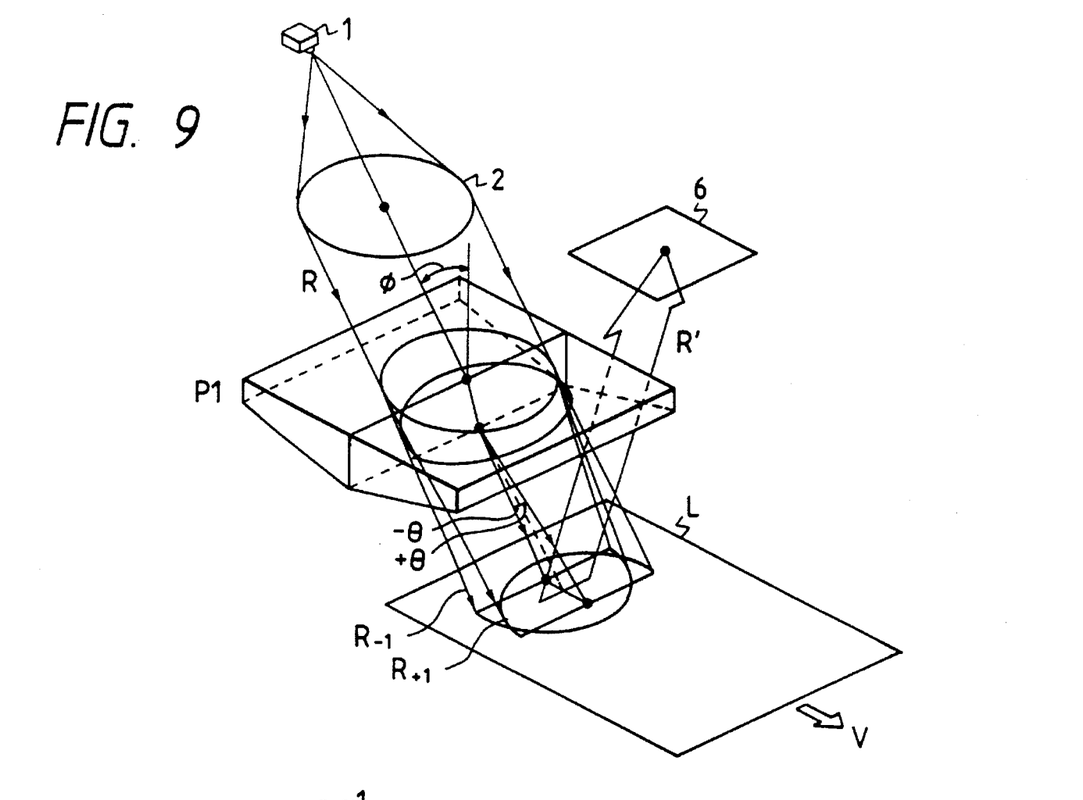
FIG. 9 is an explanatory drawing to show a sixth embodiment of the present invention.
Figure 10:
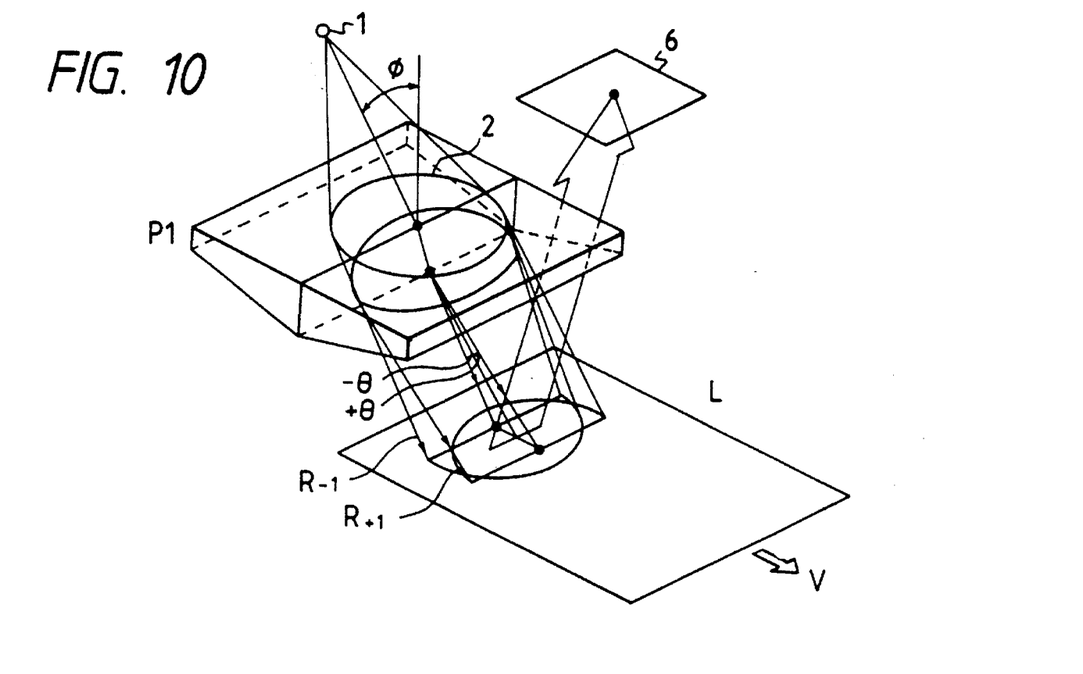
FIG. 10 is an explanatory drawing to show a seventh embodiment of the present invention.
Figure 11:
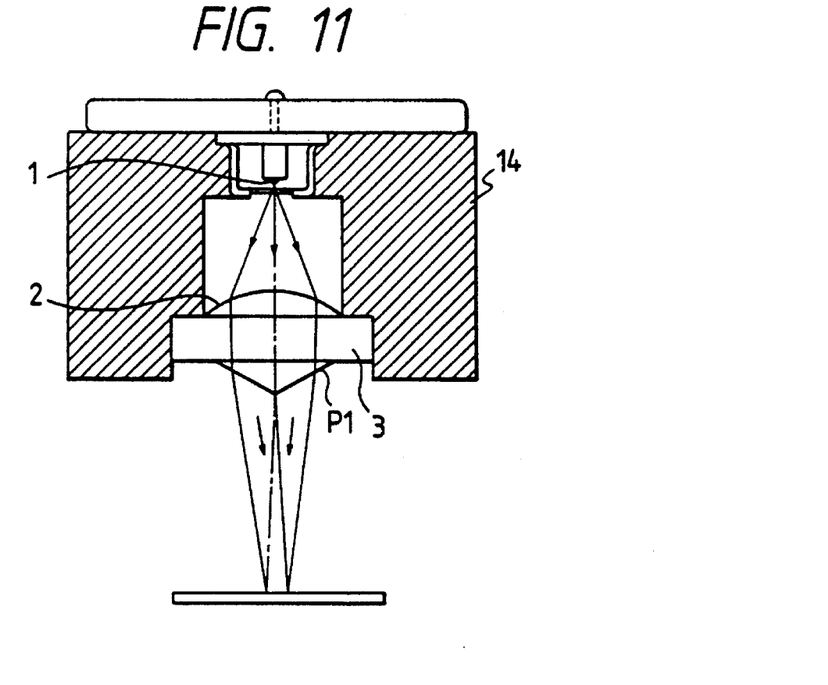
FIG. 11 is a side cross sectional view of the seventh embodiment of the present invention.
Figure 12:
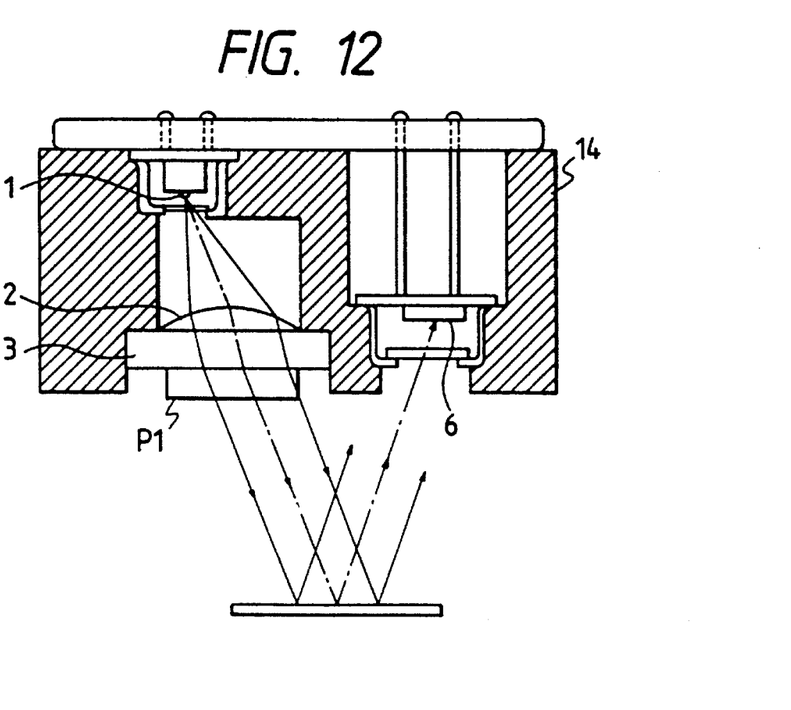
FIG. 12 is a front cross sectional view of the seventh embodiment of the present invention.

FIG. 9 and FIG. 10 are explanatory drawings to show the sixth and seventh embodiments of the present invention, respectively, and FIG. 11 and FIG. 12 are side and front cross sections, respectively, of the seventh embodiment of the present invention. The same elements as those in the first embodiment are denoted by the same reference numerals. The present embodiment employs a roof prism P1 in place of the diffraction grating. The sixth embodiment is so arranged that the lens 2 is set separately from the glass plate 3, while the seventh embodiment is so arranged that the lens 2 is set on the glass plate 3.

Divergent light emitted from the light emitting element 1 (wavelength λ) is collimated by the collimator lens 2 into a collimated beam R, the collimated beam is incident obliquely at angle φ into the roof prism P1, and the beam is split into two refracted beams R+1 and R−1, which are outgoing at respective angles +θ and −θ.

An object relatively moving at velocity v is located in a region in which the two beams outgoing from the roof prism P1 are not yet spatially completely separated from each other. The beams are scattered on the scattering surface L of the object, so that strong scattered light including the Doppler frequency component f is emergent in the direction as shown by the arrow.

The scattered light is incident at high efficiency into the light receiving element 6 set immediately next to the prism P1. The signal processing is the same as in the first embodiment.

Since these embodiments also employ no optical system for bending the optical paths of two beams in the optical system, the embodiments have the very simple structure and are suitable for miniaturization.

Since these embodiments utilize the refraction by the room prism as the double beam splitting optical system, no unnecessary light appears and the utilization factor of light quantity is high, obtaining signals with high S/N. Further, the double beam crossing region is wide before the two beams are spatially separated from each other, so that the scattered light can be efficiently produced, which permits signals with higher S/N to be obtained.

Particularly in the seventh embodiment, the prism P1 and the lens 2 are formed on the both faces of glass plate 3 as incorporated with each other, whereby the apparatus can be constructed in a simple arrangement of only three components, i.e., the light emitting element, the light receiving element and the glass plate composite optical component, which is suitable for reduction in thickness.

Figure 13:
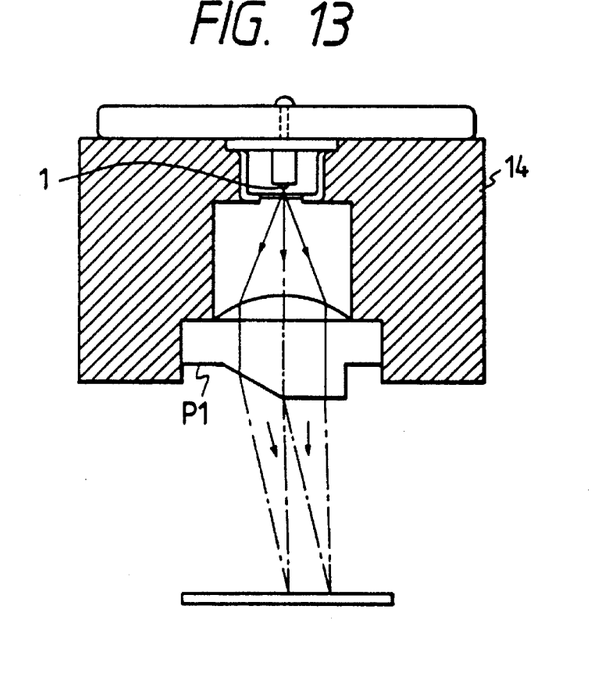
FIG. 13 is a side cross sectional view of an eighth embodiment of the present invention.
Figure 14:
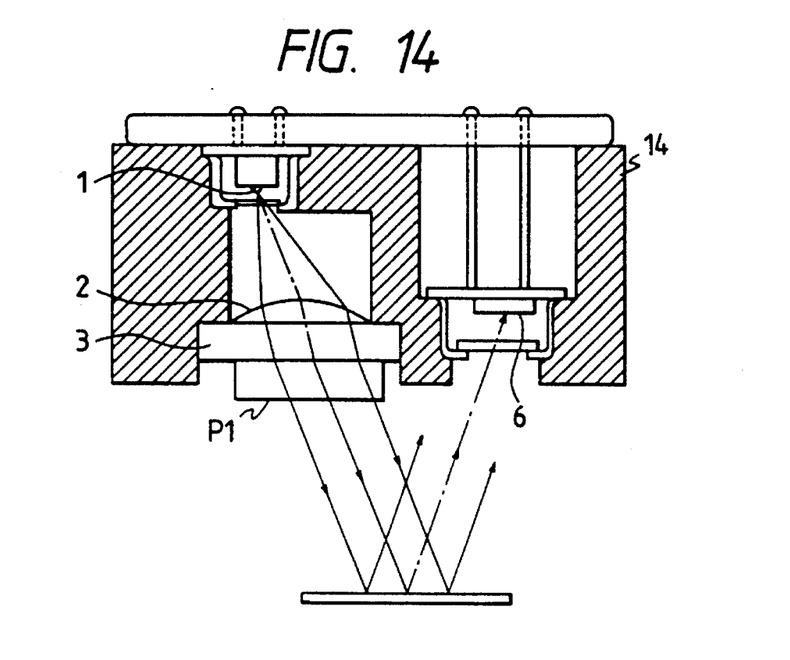
FIG. 14 is a front cross sectional view of the eighth embodiment of the present invention.

FIG. 13 and FIG. 14 are side and front cross sections, respectively, of the eighth embodiment of the present invention, in which only one of two faces of the prism is arranged as perpendicular to the beam.

Figure 15:
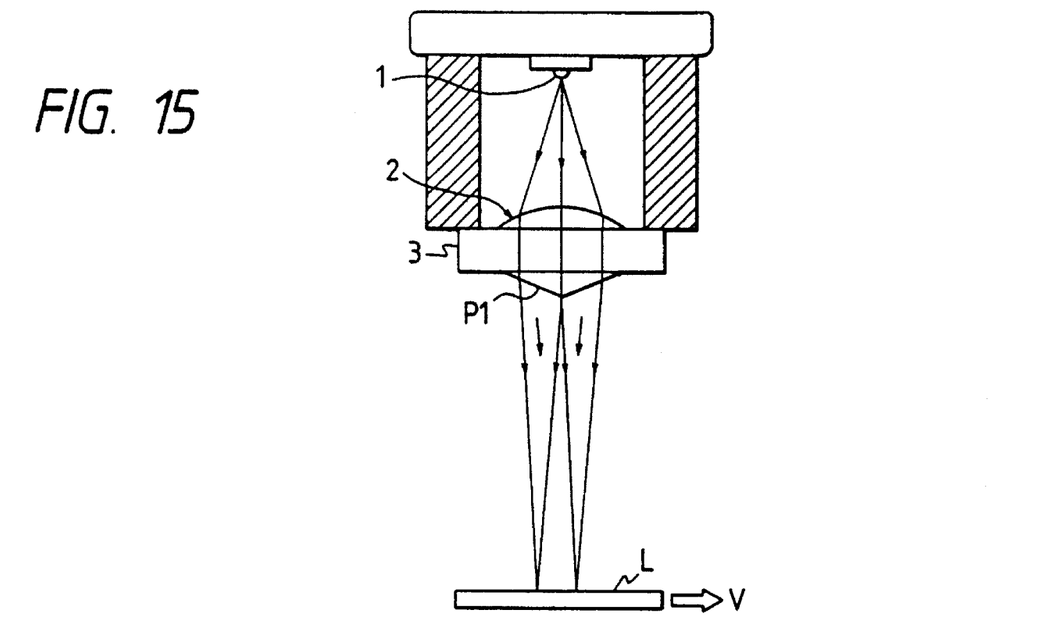
FIG. 15 is a side cross sectional view of a ninth embodiment of the present invention.
Figure 16:
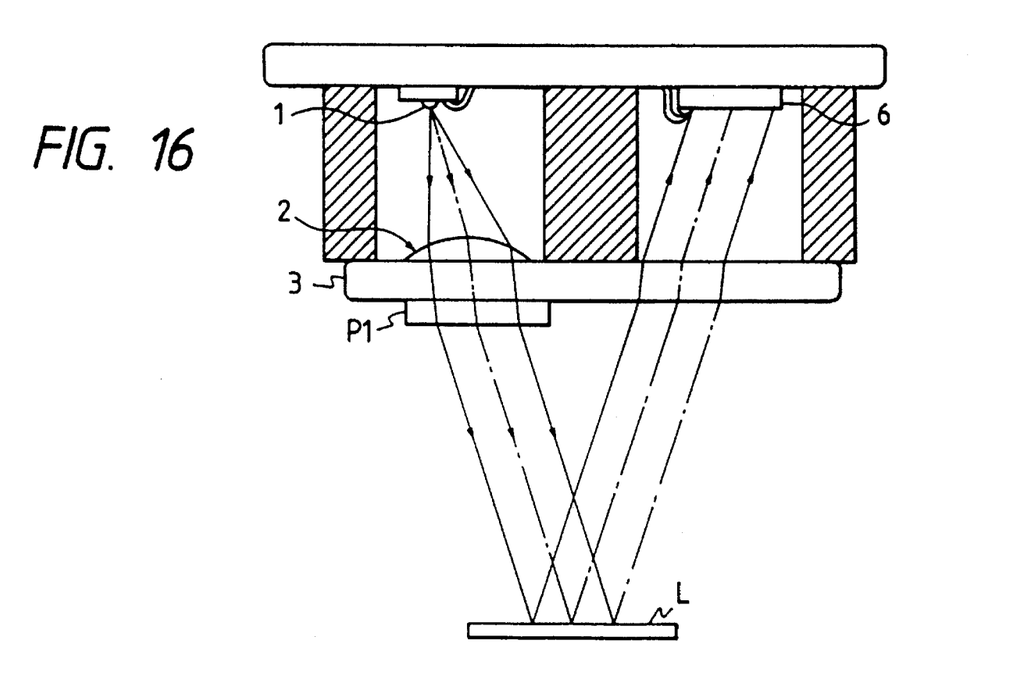
FIG. 16 is a front cross sectional view of the ninth embodiment of the present invention.

FIG. 15 and FIG. 16 are side and front cross sections, respectively, of the ninth embodiment of the present invention. This embodiment is so arranged that a portion where the prism is not formed is formed on the glass plate and that the glass plate 3 covers the light receiving element as well so that the scattered light enters the light receiving element 6 after passing through this portion.

Figure 17:
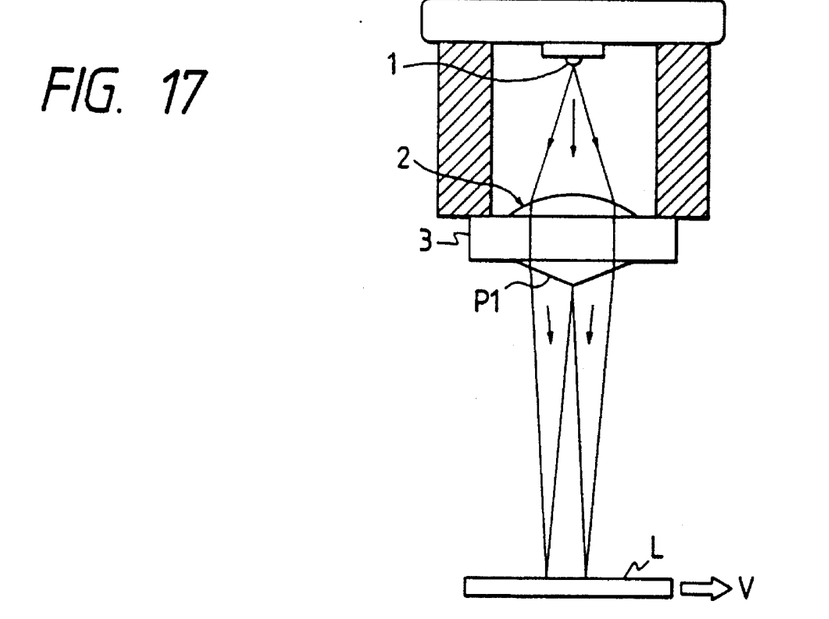
FIG. 17 is a side cross sectional view of a tenth embodiment of the present invention.
Figure 18:
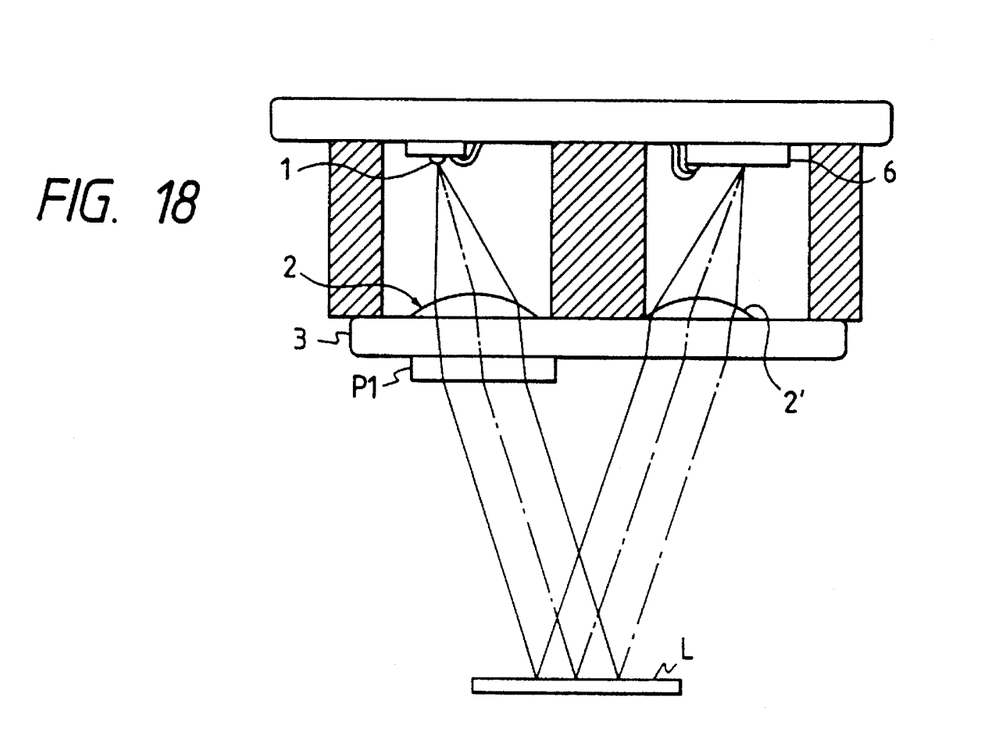
FIG. 18 is a front cross sectional view of the tenth embodiment of the present invention.

FIG. 17 and FIG. 18 are side and front cross sections, respectively, of the tenth embodiment of the present invention. This embodiment is so arranged that in addition to the arrangement of the ninth embodiment, a lens 2' is further provided on the glass plate 3 to condense the scattered light and the thus condensed light is made incident into the light receiving element 6.

As detailed above, the velocity information detecting apparatus is provided with the optical apparatus for irradiating the object, utilizing the region where the optical paths of two beams overlap with each other before the two beams emergent from the beam splitting means such as the diffraction grating are spatially completely separated from each other, and the means for receiving the scattered light from the object, realizing an apparatus composed of a fewer number of optical components, simplified in arrangement and having a reduced thickness of millimeter size.

What is claimed is:

1. A velocity information detecting apparatus for detecting velocity information in an object region, comprising:
 a light source for emitting a coherent beam;
 a beam splitting member for splitting the beam from said light source into a plurality of beams, the object region being irradiated with said plurality of beams in such a state that the object region is located in a region in which the plurality of beams outgoing from said beam splitting member are not yet spatially completely separated from each other; and
 a photodetector for receiving scattered light from said object region, wherein velocity information in the object region is detected, based on a Doppler shift of the scattered light detected by said photodetector.

2. An apparatus according to claim 1, wherein said beam splitting member comprises a diffraction grating.

3. An apparatus according to claim 2, wherein said diffraction grating is a lamellar phase grating.

4. An apparatus according to claim 2, wherein said diffraction grating is a blazed diffraction grating.

5. An apparatus according to claim 2, wherein said diffraction grating is so arranged as to prevent emergence of zeroth order light.

6. An apparatus according to claim 2, wherein said diffraction grating is so arranged as to produce substantially only ±N-th order diffracted light where N is an arbitrary natural number.

7. An apparatus according to claim 1, wherein said beam splitting member comprises a prism member for deflecting at least one of two-split incident beams within a beam cross section, toward the other beam.

8. An apparatus according to claim 7, wherein said prism member is a roof prism.

9. An apparatus according to claim 1, wherein said beam splitting member is set on one face of a transparent substrate.

10. An apparatus according to claim 9, wherein an optical member for changing a converging or diverging state of beam is provided on the other face of said transparent substrate.

11. An apparatus according to claim 1, wherein the beam from said light source is made incident obliquely into said beam splitting member in a direction perpendicular to a splitting direction of said plurality of beams.

12. An optical apparatus for forming interference fringes in an object region, comprising:
 a light source for emitting a coherent beam; and
 a beam splitting member for splitting the beam from said light source into a plurality of beams, said beam splitting member forming said plurality of beams such that said member produces substantially no outgoing beam traveling in parallel with the incident beam, said beam splitting member forming interference fringes in said object region in such a state that the object region is located in a region in which the plurality of beams outgoing from said beam splitting member are not yet spatially completely separated from each other.

13. An apparatus according to claim 12, further comprising a photodetector for receiving scattered light from said object region, wherein velocity information in the object region is detected, based on a Doppler shift of the scattered light detected by said photodetector.

14. An apparatus according to claim 12, wherein said beam splitting member is a diffraction grating, said diffraction grating being so arranged as to produce substantially no zeroth order light.

15. An apparatus according to claim 14, wherein said diffraction Grating is a lamellar phase grating.

16. An apparatus according to claim 14, wherein said diffraction Grating is a blazed diffraction grating.

17. An apparatus according to claim 12, wherein said beam splitting member is a roof prism.

18. A velocity information detecting apparatus for detecting velocity information in an object region, comprising:

a light source for emitting a coherent beam;

a light splitting member for splitting the beam from said light source into a plurality of beams, the object region being irradiated with said plurality of beams in such a state that the object region is located in a region in which the plurality of beams outgoing from said beam splitting member are not yet spatially completely separated from each other;

a photodetector for receiving scattered light from said object region; and a detecting circuit for detecting velocity information in the object region, based on a Doppler shift of the scattered light detected by said photodetector.

19. An apparatus according to claim 18, wherein said detecting circuit comprises an amplifier, a frequency filter and a binarizing circuit.

* * * * *

UNITED STATES PATENT AND TRADEMARK OFFICE
CERTIFICATE OF CORRECTION

PATENT NO. : 5,557,396
DATED : September 17, 1996
INVENTOR(S) : Ishizuka et al.

It is certified that error appears in the above-indentified patent and that said Letters Patent is hereby corrected as shown below:

COLUMN 1:

Line 47, "less" should read --fewer--.

COLUMN 2:

Line 58, "a expanse" should read --an expanse--.

COLUMN 5:

Line 23, "the very" should read --a very--.

COLUMN 7:

Line 2, "Grating" should read --grating--; and
   Line 4, "Grating" should read --grating--.

Signed and Sealed this

Eighteenth Day of March, 1997

Attest:

BRUCE LEHMAN

*Attesting Officer*    *Commissioner of Patents and Trademarks*